United States Patent [19]

Schuur

[11] 3,824,569

[45] July 16, 1974

[54] MATRIX STORE INCORPORATING NOISE-BALANCING

[75] Inventor: Cornelis Christianus Maria Schuur, Emmasingel, Eindhoven, Netherlands

[73] Assignee: U.S. Philips Corporation, New York, N.Y.

[22] Filed: Dec. 1, 1972

[21] Appl. No.: 311,445

[30] Foreign Application Priority Data

Dec. 3, 1971 Netherlands ........................ 7116619

[52] U.S. Cl. 340/174 DC, 340/174 DA, 340/174 M

[51] Int. Cl. ............................................... G11c 7/02

[58] Field of Search... 340/174 DC, 174 M, 174 DA

[56] References Cited

UNITED STATES PATENTS

| | | | |
|---|---|---|---|
| 3,305,846 | 2/1967 | Amemiya | 340/174 DA |
| 3,319,233 | 5/1967 | Amemiya et al. | 340/174 DA |
| 3,404,387 | 10/1968 | Amemiya | 340/174 DA |

*Primary Examiner*—Stanley M. Urynowicz, Jr.
*Attorney, Agent, or Firm*—Frank R. Trifari; Simon L. Cohen

[57] ABSTRACT

The signal amplifier in this three-wire matrix store is connected to the centres of two sense wires. During reading the noise caused by the X-selection current is balanced by a second X-selection current, so that both sense wires pick up the same noise. As a result of a correct orientation of the second core which is selected by coincident currents, the latter core does not switch. The noise caused by the Y-selection current is balanced by a similar, opposed noise on the other half of the same sense wire. During a write operation the core is again selected by coincident currents, an inhibit current on the half of a sense wire then causing a "zero" to be written. The cores are threaded according to a double fishbone pattern.

6 Claims, 7 Drawing Figures

MATRIX STORE INCORPORATING NOISE-BALANCING

Figure 1:
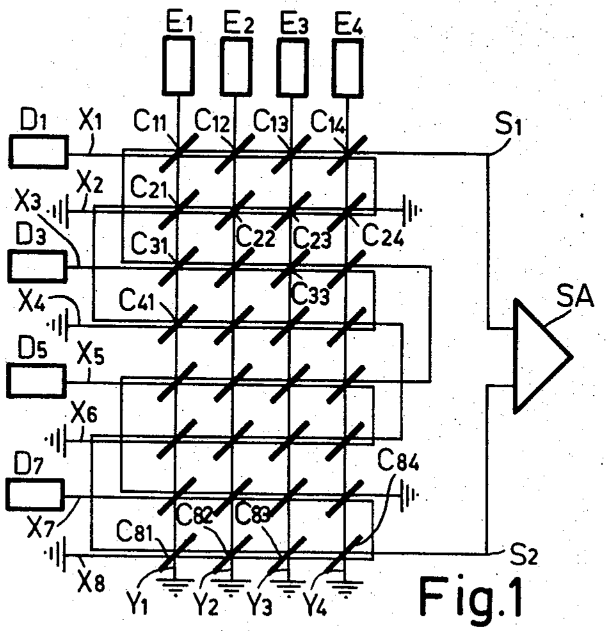

The invention relates to a store comprising magnetic storage elements which are arranged in rows and columns in a densely packed rectangular array and which are provided one row selection wire per row and one column selection wire per column and two sense wires. Each of the sense wires is associated with one half of the rows. It is possible to read the information of a storage element by simultaneous, like driving of the row and the column selection wire associated with said storage element by selection currents. It is also possible to balance the noise caused by a first row selection current in a row selection wire on a first sense wire which is associated with the relevant row by simultaneous driving of a second row selection wire. The second row selection wire driving current is unlike to the column selection current with respect to a storage element on the intersection and has the same direction with respect to the second sense wire associated with the relevant row as the first row selection current with respect to the first sense wire. A densely packed rectangular array is to be understood to mean a formation in which generally a storage element is present on each intersection of a row and a column. The rows and columns may enclose an angle which differs from 90°. It is alternatively possible that a few intersections are not occupied, for example, in that a storage element is defective or in that a given row or column of storage elements has a slightly different functionn for which not all storage elements of this row or column are required.

Such a store incorporating noise-balancing is known, for example, from I.B.M. Technical Disclosure Bulletin, Vol 11, no. 9, February 1969, p. 1157, for example, FIG. B. The row selection wires are each time connected in series in a two-by-two relationship so that each time the cores of two rows are selected when a row selection current is applied. Each of the two series-connected row selection wires extends parallel to a portion of one of the two series wires. The direction of driving of these two row selection wires is the same with respect to the sense wires: for example, each time corresponding to the direction towards the connection terminals of the amplifier. As a result, the noises caused by the row selection current are substantially equal to each other in a absolute sense. For a read operation a column selection wire and a pair of row selection wires are simultaneously driven. This may mean that the row selection current and the column selection current have the same waveform, viewed in time, but this is not necessary. They need not be accurately of equal amplitude either. It is sufficient that for some time they are both present. The first of the two magnet cores on the intersections is selected according to the coincident-current principle because for this magnet core the row selection current and the column selection current are like, i.e. these selection currents produce magnetic fields in the same direction in the magnet core. The second core on the other intersection is not subject to coincident-current selection, because for this core the selection current are unlike; the produced magnetic fields have opposite directions. The core is read by coincident-current selection: the magnetization is changed to that of the rest state. The signal on the sense wire is influenced by the face whether or not the magnetization was already in the rest state. These two states can be arbitrarily defined as a 1 or a 0.

The drawback of a store of this kind is that, owing to the construction of the store, the cancelling noises on the input of the signal detector (difference amplifier) are subject to different time delays, before they arrive at the signal detector, so that a dynamic residual phenomenon remains as noise. This time delay is determined by the length of the sense wires between the location where the noise occurs and the signal amplifier, but particularly by the number of cores threaded on this part of the sense wire.

A similar phenomenon occurs for the noise caused by the column selection current. This noise is of a slightly different nature than the noise caused by the row selection current. The latter is mainly electrostatic because part of the row selection wire is brought to a different potential when the selection current is applied. The noise caused by the column selection current is mainly due to the transformer action of magnetic cores. The noise caused by the column selection current can be compensated for on one sense wire by selecting the correct position of the cores on the intersections (counter clockwise and clockwise, respectively), so that the winding sense of the turns (column selection wire and sense wire, respectively) on the transformer yoke (the magnet core) can be reversed as it were. However, because the delay time of the noise on the sense wire to the input terminal of the signal amplifier differs in the known store, a dynamic residual phenomenon will again remain. A solution is possible according to the invention which is characterized in that the lengths of the sense wires between the storage elements on the intersections of the column selection wire thus driven and the two row selection wires thus driven on the one side, and the connection terminals of a provided signal detector on the other side, are substantially equal to each other in an electrical sense. A column selection wire on pairs of second intersections, with the same sense wire which has substantially the same length in an electrical sense between each of said second intersections and a first connection terminal of the signal detector, is associated with the storage elements on the second intersections once in a like manner and once in a manner which is unlike to said sense wire. The inventor has recognized the foregoing problem and has, moreover, given the solution to the problem. The degree in which the "approximate quality" must be realized is dependent of the susceptibility to noise of the signal amplifier and of other requirements to be satisfied by the store. In the case of a very fast store it is advantageous to improve the "approximate equality." In contrast therewith, the quoted publication does not even indicate the start of a realization of such a solution, which is demonstrated by the fact that each time only four rows of cores are shown. The described difficulty is more significant as the number of rows as well as the number of cores in each row increases.

A preferred embodiment according to the invention is characterized in that both sense wires are connected near their centers to the connection terminals of the signal detector. The delay time of the noise depends on the length of the sense wire and of the number of threaded cores. The delay time also depends on the information stored in the cores, and on thickness variations of the sense wire. The same applies to the signal pulse which is produced by the reading of stored information. The smaller the number of cores the better; this minimizes the length of the sense wire. While it was already known to connect the sense wire to the signal amplifier at its center, within the scope of the invention an additional advantage is achieved in that, viewed in time, the noise is better balanced. The variation in the information contents can change the delay time by 5–10 percent in given cases. By keeping the length small, this variation is also reduced. In a store of this kind information is written in a storage element by like driving of the assiciated selection wires with second selection currents. A preferred embodiment of a store according to the invention is characterized in that the second column selection current can be inhibited by an inhibit current in the half of a sense wire which is associated with this storage element. The said half is thus associated with a quarter of the rows. The said inhibit current is furthermore associated in an unlike manner with respect to the second column selection current with the storage elements on the intersections of the relevant column selection wire and said half. Selection of cores which are associated with the first half of a sense wire can thus be prevented by the inhibit current, while on the other hand the second half offers all possibilities for unlike coupling of the associated cores of the same column with respect to the column selection current.

Another preferred embodiment according to the invention in which the storage elements are formed by toroidal bodies which can have a first and a second orientation on said intersections is characterized in that the sense wires are assocaited with alternating rows. The orientation of the toroidal bodies of an odd row is opposed to the orientation of the toroidal bodies of the directly subsequent even row and is the same as the orientation of the toroidal bodies on the directly preceding even row. In this manner a regular construction is obtained, while the different orientations can be readily realized according to the commonly used wiring method.

A further preferred embodiment according to the invention is characterized in that the rows form a number of groups comprising the same number of successive rows, the said number being at least equal to two. The orientation of the storage elements of successive groups being opposed. It was found that the threading of the toroidal bodies (cores) on the wires can be more readily performed if the cores of successive rows have the same orientation. Consequently, the less changes in orientations between successive rows, the easier the threading operation. The number of transpositions is reduced by composing the said groups of more than two rows.

A further preferred embodiment according to the invention is characterized in that the rows are divided into two groups, the storage elements of each groups having the same orientation, the groups being arranged on both sides of a support. On the one hand, the number of transpositions must be reduced. However, it appears that the sense wire then obtains an irregular pattern. By division of the rows into two groups on both sides of a support, however, a simple solution is obtained.

The invention will be described with reference to some figures. FIG. 1 shows an example of a store according to the present state of the art. FIGS. 2–7 show a number of embodiments of a store according to the invention.

FIG. 1 shows a matrix store according to I.B.M. Technical Disclosure Bulletin, Vol. 11, No. 9, February 1969, p. 1157, in which the number of storage elements (toroidal cores) is increased to 32 for the sake of clarity. The store comprises the cores C11, 12, 13, 14, 21, . . . 24, 31 . . . 84. They are threaded by the row selection wires, two of which are each time connected in series. The row selection currents are supplied by the generators D1, 3, 5, 7, whereby each time two rows can be selected. The column selection currents are supplied by the generators E1 . . . 4, whereby each time one column can be selected. Also provided are two sense wires S1 and S2 and a signal amplifier SA.

The matrix forms part of a series of matrices, in each of which at the most one bit of a stored word can be stored. Assume that this bit is stored in the core C13. For reading this bit, the row selection wire X1 and the column selection wires Y3 are driven by positive currents from the generators D1 and E3, respectively. The currents are directed to ground. In this manner core C13 is selected because the currents through the selection wires X1 and Y3 have the same direction with respect to this core. Core C23 is not selected because the currents through X2 and Y3 are opposed with respect to this core. The cores C11, 13, 14, 21, 22, 24, 33, 43, 53, 63, 73 and 83 are half-selected by only a single current, and the remaining twenty one cores are not at all selected. C13 is magnetized in the "zero" state by the like currents. If it was previously in the "one" state, this will cause a switching signal on the sense wire S1. On the other hand, a noise signal arises on the sense wire S1 because the wire X1 extends in parallel therewith at a small distance therefrom. The wire X2 extends in a similar manner parallel to the sense wire S2, and on these two wires noise of the same magnitude and direction is thus produced. The signal amplifier SA operates as a difference amplifier, and thse two noises are subtracted from each other. The time delay of these noises prior to the arrival at SA, however, differs: the noise caused by X1 quickly arrives at SA, but the noise caused by X2 must pass through substantially the complete wire S2. Due to the time difference a substantial residual noise always remains. The same applies if a "zero" was stored in the above case: the signal amplifier then detects the missing of a switching signal, which serves as the indication of the stored zero. However, if for example core C23 must be read, a current having the opposite direction is generated by the generator D1.

Figure 2:
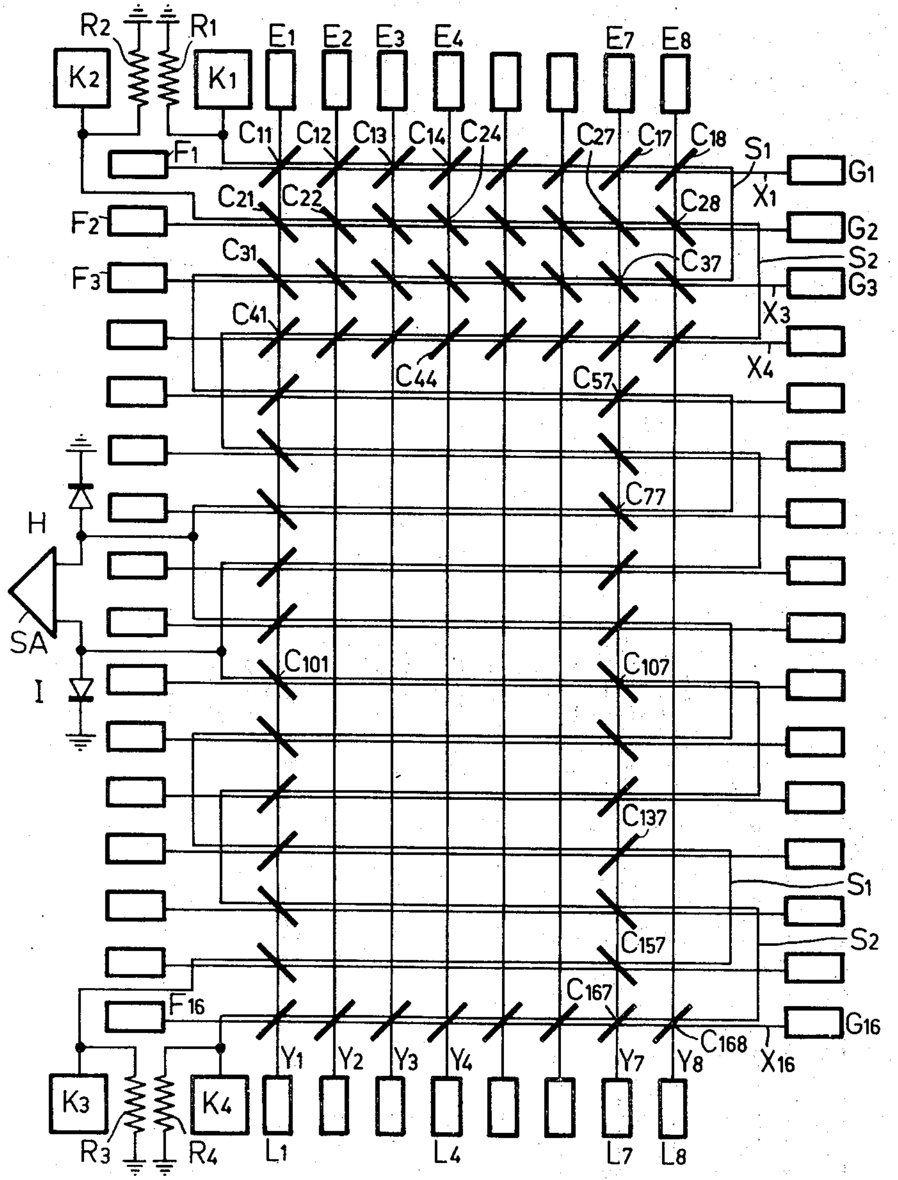

FIG. 2 shows a store according to the invention. Corresponding elements are denoted by the same references as in FIG. 1. The store comprises 128 magnet cores C11 . . . 18, C21 . . . 28, C31 . . . 168, sixteen row selection wires X1 . . . 16, and eight column selection wires Y1 . . . 8 which are associated with the generators F1 . . . 16, G1 . . . 16, E1 . . . 8 and L1 . . . 8, respectively. Also provided are two sense wires S1, 2 with the signal amplifier SA, two diodes H and I, and four write amplifiers K1 . . . 4 with terminating resistors R1 . . . 4, For the sake of simplicity only part of the cores are shown and provided with a reference.

Assume that core C17 is read. The row selection wire X1 is then driven by the generators F1 and G1, and the column selection wires Y7 is driven by the generators E7 and L7, so that the currents are applied to the magnet core C17 in like manner. At the same time, the row selection wire X2 is driven in the same direction by the generators F2 and G2, for example, such that the current flows from F2 to G2. Due to the different orientation of the core C27, the two generated currents cancel so that no read operation is performed. Furthermore, the delay time of the two noises caused by the driving of the row selection wires is equal for both sense wires S1 and S2 because each time three rows of cores are connected between the first and the second row and the connection points of the signal amplifier SA. A second source of noise exists in that the cores on the intersections of the column selection wire Y7 and the sense wires operate as transformers. Assume that Y7 is driven such that the current flows from E7 to L7. The generated counter-current, consequently, is directed to the left at the core C17, to the right at the core C37 etc. Similarly, the current generated at core C157 is directed to the right. The noise caused by the cores C17 and C157 is anti-symmetrical with respect to the signal amplifier. The delay times are equal, so they cancel. This also applies to the noises caused by the cores C37 and C137, etc. When the core C27 is read, the row selection wires X1 and X2 are driven by currents in directions which are opposed to those required for the reading of core C17. The equality of the delay times is not fully guaranted, but is influenced, as already stated, by the information in the cores to be passed. However, the numbers of cores are now equal in any case.

When information is written in a core, the core is again selected by two coincident currents which are opposed to those used for reading. However, in this case only one row selection wire must be driven because in this case the noise is of no importance. If a "zero" is written, moreover, an inhibit current is generated by the associated write amplifier (for core C17, this is the wire amplifier K1) so that the driving of rows and columns is counteracted. In this way the core remains in the "read" state, which is defined as "zero" in this case. The terminating resistor, for example, R1 serves to counteract undesired reflections; the diodes, for example, H serve to prevent the large inhibit current from reaching the signal amplifier SA. The inhibit current is thus depleted to ground via this diode. The write amplifier K1 thus generates an inhibit current in one half of a sense wire. On the intersections with the driven column selections wire this inhibit current is always unlike to the second selection current generated in this column selection wire. Consequently, if core C17 is written in, the latter applies to the cores C37, C57 and C77.

Figure 3:
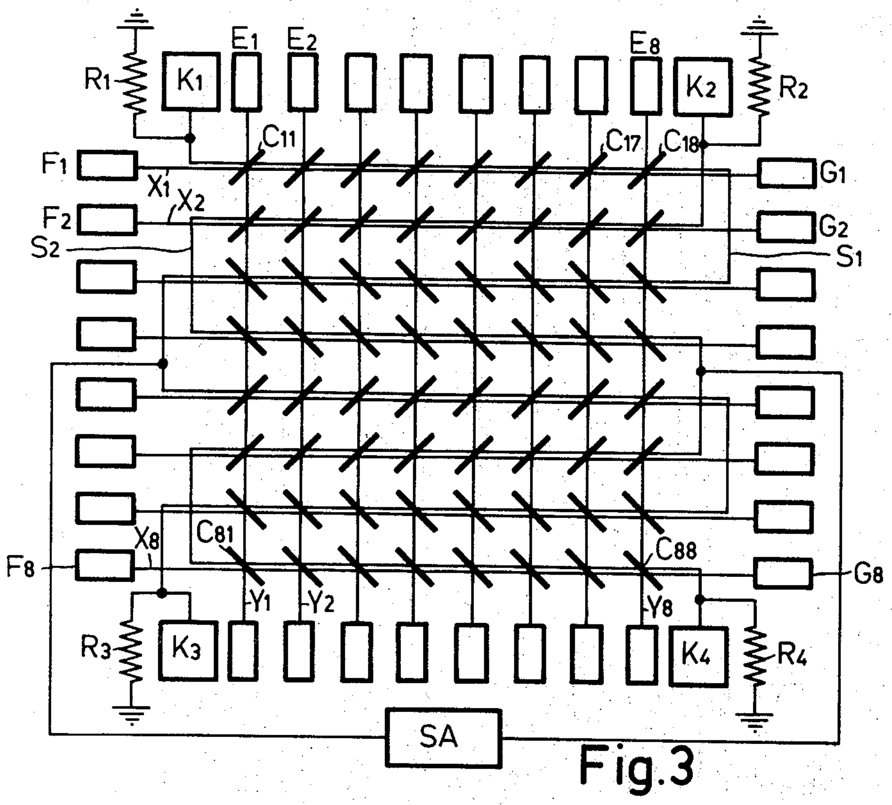

FIG. 3 shows another embodiment of a storage matrix according to the invention. This storage matrix differs from that shown in FIG. 1 not only as regards the number of storage elements, but also in that the sense wire S2 and the cores connected thereto are left/right mirror-inverted with respect to FIG. 2, which also applies to the current directions in the row selection wires and those in the sense wire S2. The noise caused by the transformer action of the magnet cores under the influence of the column selection current now exhibit only small differences in time delay, i.e. no more than the time which is required for passing through a row. However, this effect is independent of the number of rows so it will not be serious either in the case of very large stores. The diodes H and I are not shown in this figure.

Figure 4:
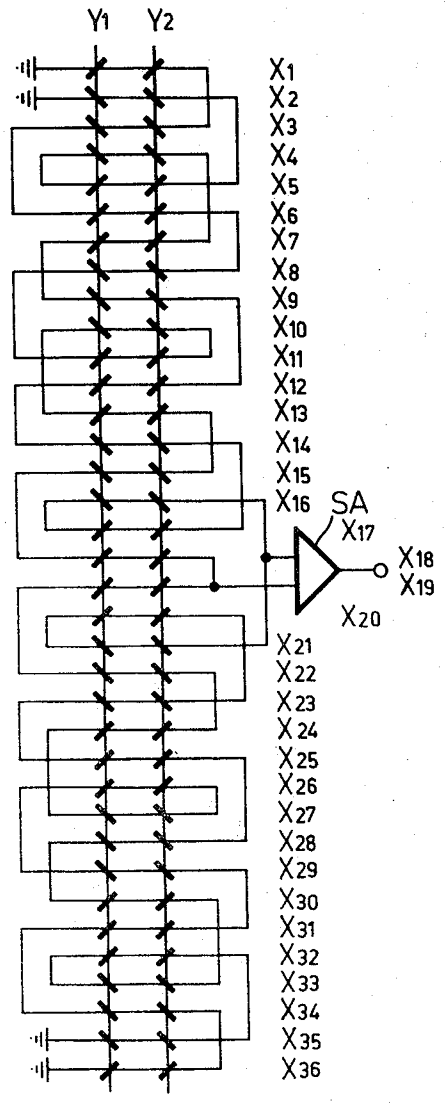

FIG. 4 shows another embodiment yet of the store according to the invention. For the sake of simplicity the row selection wires are not shown, and neither are the terminating resistors, the generators and the write amplifiers. The rows of elements from groups of three which each time have the same orientation. In this way the sequence 1-3-3-3-3-3-4-3-3-3-3-3-1 is produced. This regularity does not exist at the ends and at the center. For the reading of the cores, each time two row selection wires are driven in the same direction in the following combinations:

X1 and X2
X3 and X5
X4 and X6, after which the same pattern is repeated.

The sequence is reversed for the rows 19 . . . 36.

Figure 5:
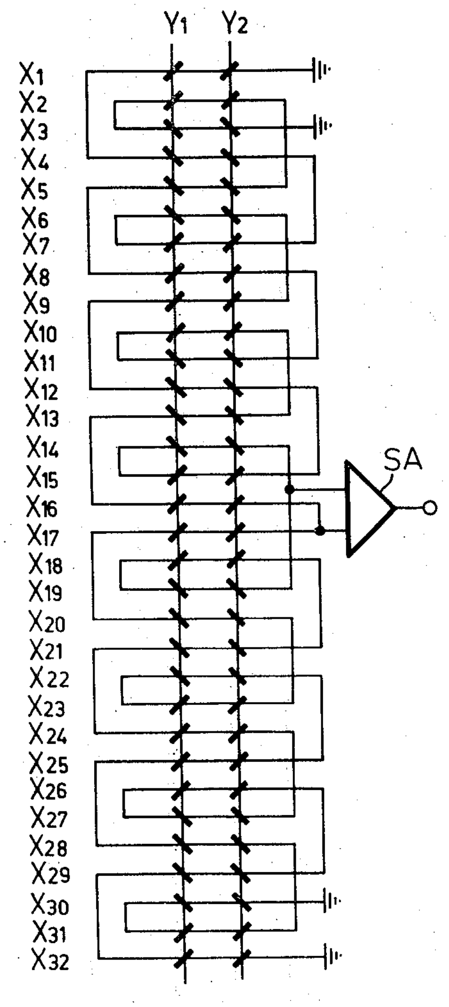

FIG. 5 illustrates a case which is similar to that shown in FIG. 4, but in this case a 2-4-4 . . . 4-4-2 pattern is involved. Each group now consists of 4 rows, except on the ends. For the reading of the cores two row selection wires are each time driven in the same direction in the combinations:

X1 and X3
X2 and X4
X5 and X7 X6 and X8 etc.

Figure 6:
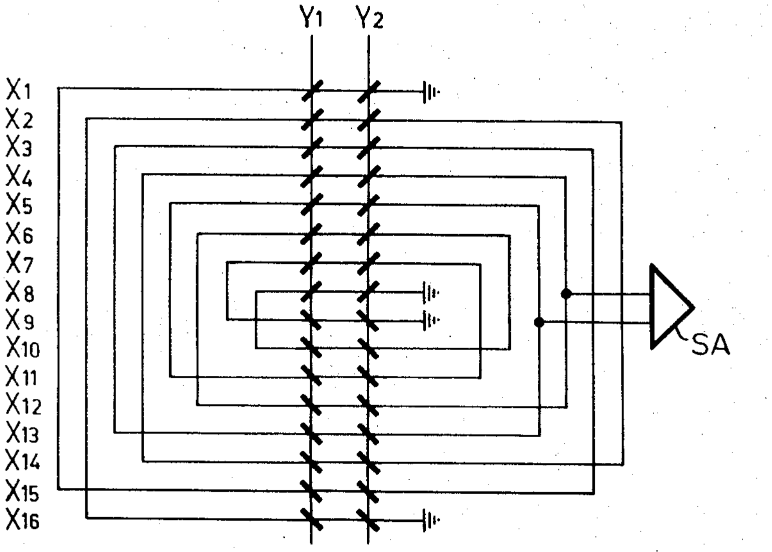
Figure 7:
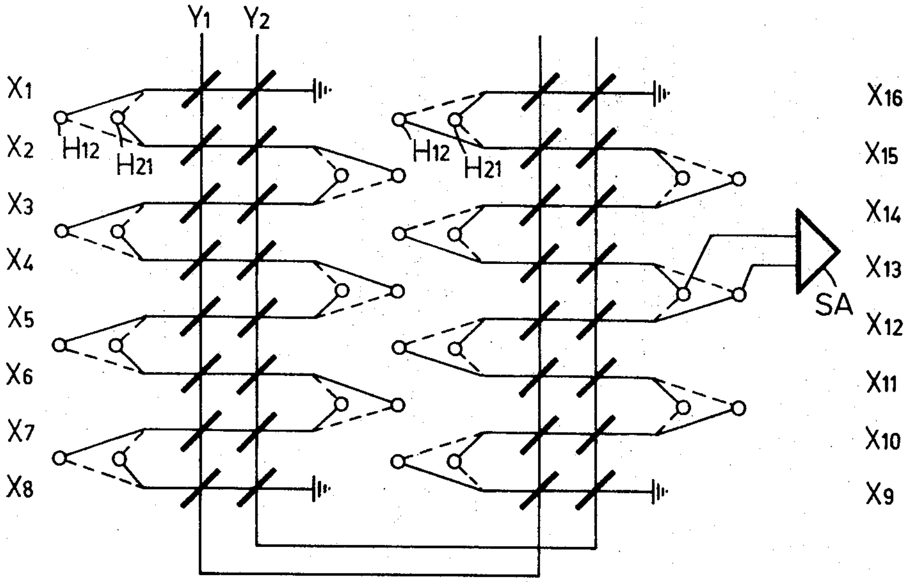

FIG. 6 shows another case in which there are only two groups of rows, each of which comprises half the number of rows. For the reading of the cores again two row selection wires are each time driven in the same direction in the following combinations.

X1 and X16
X2 and X15
X3 and X14 etc.

It appears that the connections of the sense wires between the rows become very long. This is avoided by dividing the store of FIG. 6 into an upper half and a lower half and by folding over the lower half. It is then possible to use a support of half the size and to provide this support with storage elements on both sides. This is diagrammatically shown in FIG. 7. As a result of the folding, all elements of the upper half (at the left in the drawing) and the lower half (at the right in the drawing) have the same orientation. The two halves are both shown in plan view. The connection between the row 1 (row selection wires X1) and the row 15 (row selection wire X15) extends via the contact H12 which constitutes an interconnection through the support. The connections of the relevant half are denoted by solid lines in the drawing; those of the other half are denoted by broken lines: the connections of H12 to X1 and X15, respectively. It will be obvious that the sense wires will be short again, so they are easy to connect.

It appears that the concept of the invention can be realized in many different ways. For example, other patterns can be used. It is also obvious that the use of other storage elements is also covered by the invention. Instead of toroidal cores use can be made of, for example, needle-like elements or biax elements.

What is claimed is:

1. In a store comprising magnetic storage elements arranged in rows and columns in a densely packed array provided with one row selection wire per row and one column selection wire per column and two sense wires, each of which passes through one half of the rows and is connected to a separate input of a summing-type signal detector, whereby the information of a storage element is read by means simultaneously driving the row and the column selection wires associated with said storage element with selection currents in the same sense, and whereby the noise cuased by a first row selection current in a row selection wire on a first sense wire which is associated with the relevant row is balanced by means simultaneously driving a second row selection wire, the latter driving current being in the opposite sense of the column selection current with respect to a storage element on the intersection and having the same direction with respect to the second sense wire associated with the relevant row as the first row selection current with respect to the first sense wire, the improvement wherein the lengths of the sense wires between the storage elements on the intersections of the column selection wires thus driven and the two row selection wires thus driven and the connection terminals of the signal detector, are substantially equal to each other in an electrical sense and pass through the same number of rows of storage elements, and wherein each column selection wire intersects the first and second sense wire at pairs of second intersections (C17 and C157, C37 and C137), each pair of second intersections with the same sense wire having substantially the same length in an electrical sense between each of said second intersections and a first connection terminal of the signal detector being associated with and passing through the storage elements on the second intersections once in a like manner and once in a manner which is unlike to said sense wire.

2. A store as claimed in claim 1, wherein both sense wires are connected near their centers to the connection terminals of the signal detector.

3. A store as claimed in claim 1 in which information is written in a storage element by like driving of the associated selection wires by means of selection currents, further comprising means for providing an inhibit current in the half of a sense wire that passes through this storage element for inhibiting the second column selection current, the said half thus being responsive to a quarter of the rows, the said inhibit current passing in an unlike manner with respect to the column selection current through the storage elements on the intersection of the relevant column selection wire and said half.

4. A store as claimed in claim 1, in which the storage elements are formed by toroidal bodies wherein the sense wires pass through alternating rows, the orientation of the toroidal bodies of an odd row being opposed to the orientation of the toroidal bodies of the directly subsequent even row and being the same as the orientation of the toroidal bodies on the directly preceding even row.

5. A store as claimed in claim 1, in which the storage elements are formed by toroidal bodies wherein the rows form a number of groups comprising the same number of successive rows, the said number being at least two, the orientation of the storage elements of successive groups being opposed.

6. A store as claimed in claim 1, in which the storage bodies are formed by toroidal bodies, wherein the rows are divided into two groups, the storage elements of each group having the same orientation, the groups being arranged on both sides of a support.

* * * * *